United States Patent
Izuma et al.

(10) Patent No.: US 11,056,699 B2
(45) Date of Patent: Jul. 6, 2021

(54) FUEL CELL SYSTEM

(71) Applicant: HITACHI ZOSEN CORPORATION, Osaka (JP)

(72) Inventors: Kyohei Izuma, Osaka (JP); Kazuki Wakamiya, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 302 days.

(21) Appl. No.: 16/304,751

(22) PCT Filed: May 30, 2017

(86) PCT No.: PCT/JP2017/020085
§ 371 (c)(1),
(2) Date: Nov. 27, 2018

(87) PCT Pub. No.: WO2017/209123
PCT Pub. Date: Dec. 7, 2017

(65) Prior Publication Data
US 2019/0207231 A1    Jul. 4, 2019

(30) Foreign Application Priority Data
May 31, 2016   (JP) .............................. JP2016-108909

(51) Int. Cl.
*H01M 8/04*       (2016.01)
*H01M 8/04225*   (2016.01)
(Continued)

(52) U.S. Cl.
CPC ..... *H01M 8/04225* (2016.02); *H01M 8/0267* (2013.01); *H01M 8/04* (2013.01);
(Continued)

(58) Field of Classification Search
CPC ........... H01M 8/0267; H01M 8/04223; H01M 8/04268; H01M 8/04225; H01M 8/04302
(Continued)

(56) References Cited

U.S. PATENT DOCUMENTS

2008/0118795 A1*  5/2008  Yoshikata ......... H01M 8/04268
                                                               429/423
2011/0065013 A1   3/2011  Nishimura et al.
(Continued)

FOREIGN PATENT DOCUMENTS

CN    101953011 A1   1/2011
CN    102195059 A    9/2011
(Continued)

OTHER PUBLICATIONS

International Preliminary Report on Patentability and Written Opinion of the International Searching Authority dated Dec. 4, 2018 issued in corresponding International Application No. PCT/JP2017/020085 with English translation.
(Continued)

*Primary Examiner* — James M Erwin
(74) *Attorney, Agent, or Firm* — Pillsbury Winthrop Shaw Pittman, LLP

(57) ABSTRACT

In a fuel cell system, the output from a plurality of fuel cells can reach an output greater than or equal to auxiliary driving power in a short time because the initial supply amount of raw fuel supplied from a raw fuel supply part is greater than or equal to a first supply amount that is a raw fuel supply amount corresponding to the auxiliary driving power. Thus, even if the raw fuel is supplied at the initial supply amount when a power failure has occurred in an electric power system during a startup operation of the fuel cell system, it is possible to supply electric power from the fuel cells to the auxiliary machinery and continue to drive the auxiliary
(Continued)

machinery under the control of a startup controller. This suppresses the stop of the fuel cell system under the startup operation.

15 Claims, 4 Drawing Sheets

(51) Int. Cl.
    *H01M 8/12*     (2016.01)
    *H01M 8/04858*     (2016.01)
    *H01M 8/04302*     (2016.01)
    *H01M 8/04223*     (2016.01)
    *H01M 8/0267*     (2016.01)
    *H01M 8/04014*     (2016.01)
    *H01M 8/0432*     (2016.01)
    *H01M 8/124*     (2016.01)

(52) U.S. Cl.
    CPC ... *H01M 8/04014* (2013.01); *H01M 8/04223* (2013.01); *H01M 8/04268* (2013.01); *H01M 8/04302* (2016.02); *H01M 8/04373* (2013.01); *H01M 8/04858* (2013.01); *H01M 8/04925* (2013.01); *H01M 8/12* (2013.01); *H01M 2008/1293* (2013.01)

(58) Field of Classification Search
    USPC ............................................... 429/429
    See application file for complete search history.

(56) References Cited

U.S. PATENT DOCUMENTS

| | | |
|---|---|---|
| 2011/0217603 A1 | 9/2011 | Otsuka et al. |
| 2012/0028149 A1 | 2/2012 | Hatada |
| 2013/0108937 A1 | 5/2013 | Takebe et al. |
| 2014/0023946 A1 | 1/2014 | Akagi et al. |
| 2014/0193733 A1* | 7/2014 | Saito ............... H01M 8/04074 429/436 |
| 2015/0336471 A1 | 11/2015 | Yoon et al. |
| 2016/0099476 A1* | 4/2016 | Palumbo ........... H01M 8/04067 429/434 |

FOREIGN PATENT DOCUMENTS

| | | |
|---|---|---|
| CN | 102365779 A | 2/2012 |
| CN | 102986074 A | 3/2013 |
| CN | 103579648 A | 2/2014 |
| JP | 11-106204 A | 4/1999 |
| JP | 2004-071312 A | 4/2004 |
| JP | 2008-218276 A | 9/2008 |
| JP | 2010-027579 A | 2/2010 |
| JP | 2011-204600 A | 10/2011 |
| JP | 2014-182884 A | 9/2014 |
| JP | 2015-186408 A | 10/2015 |
| JP | 2016-046982 A | 4/2016 |

OTHER PUBLICATIONS

International Search Report PCT/JP2017/020085 dated Jul. 18, 2017 w/English translation.
Extended European Search Report dated Dec. 17, 2019 issued in corresponding EP Application No. 17806676.7.
Office Action dated Jan. 6, 2021 issued in corresponding Chinese Patent Application No. 201780033232.9 (6 pgs.).

* cited by examiner

FUEL CELL SYSTEM

CROSS-REFERENCE TO RELATED APPLICATIONS

This Application is the U.S. National Stage of PCT/JP2017/020085, filed May 30, 2017, which claims priority to Japanese Patent Application No. 2016-108909, filed May 31, 2016, the contents of each are incorporated herein by reference in entirety.

TECHNICAL FIELD

The present invention relates to a fuel cell system.

BACKGROUND ART

Various fuel cell systems for generating electric power by using fuel cells have conventionally been proposed (e.g., Japanese Patent Application Laid-Open No. 2014-182884 as Document 1 and Japanese Patent Application Laid-Open No. 2015-186408 as Document 2). Fuel cell systems using solid oxide fuel cells need to raise the temperatures of the fuel cells to high temperatures in the range of approximately 600 degrees Celsius to 1000 degrees Celsius during their startup operation. In such fuel cell systems, in particular, in fuel cell systems for business or industrial use, the temperatures of the fuel cells are raised over a relatively long period of time (e.g., 8 to 15 hours) by using, for example, a gas burner. When the temperature rise of the fuel cells has ended, the supplies of fuel gas and oxidant gas to the fuel cells are started while the fuel cells continue to be heated by the gas burner or other heating medium, so that current drawing (i.e., loading) from the fuel cells is started.

In general, the solid oxide fuel cells are not so highly durable to a rapid state change, and thus it is not desirable to supply large amounts of fuel gas and oxidant gas to the fuel cells at the start of loading. If the fuel gas and the oxidant gas are supplied in amounts corresponding to a rated output to the fuel cells at the start of loading, there is a risk that the temperature of a combustor, which burns unutilized fuel gas that has passed through the fuel cells, will increase excessively due to the fuel cells using only a small amount of fuel gas for electric power generation. In view of this, for example, the loading of a fuel cell system repeats the process of supplying relatively small amounts of fuel gas and oxidant gas to the fuel cells and waiting until the output from the fuel cells is stabilized, and then increasing the amounts of supply of the fuel gas and the oxidant gas in stages. Accordingly, the output from the fuel cells also increases in stages and reaches the rated output over a relatively long period of time (e.g., one hour).

Incidentally, if a power failure has occurred in an electric power system of an installation where the aforementioned fuel cell system is installed during the loading of the fuel cell system, for example, mechanisms for supplying the fuel gas and the oxidant gas to the fuel cells and the gas burner for heating the fuel cells will stop and accordingly the fuel cell system will stop. As a result, the fuel cell system needs to do a time-consuming startup operation (i.e., temperature rise of the fuel cells and loading) over again. Documents 1 and 2 have proposed the methods of controlling a fuel cell system when a power failure has occurred in the electric power system of an installation during the steady operation of the fuel cell system, but they fail to give consideration to the case where a power failure has occurred during the startup operation of the fuel cell system.

SUMMARY OF INVENTION

The present invention is intended for a fuel cell system, and it is an object of the present invention to suppress the stop of the fuel cell system when a power failure has occurred in the electric power system of an installation during the startup operation of the fuel cell system.

The fuel cell system according to the present invention includes a reformer that reforms raw fuel to generate fuel gas, a solid oxide fuel cell that generates electric power by using the fuel gas and oxidant gas, a housing that houses the reformer and the fuel cell in an internal space thereof, a raw fuel supply part that supplies the raw fuel to the reformer, an oxidant gas supply part that supplies the oxidant gas to the fuel cell, an exhaust gas combustor that burns unutilized fuel gas discharged in an unutilized state from the fuel cell, a startup controller that controls the raw fuel supply part to increase an amount of the raw fuel supplied from the raw fuel supply part in stages during a startup operation performed until an output of the fuel cell reaches a steady operation output, and a heater that heats an interior of the housing during the startup operation. For the amount of the raw fuel supplied from the raw fuel supply part during the startup operation, a plurality of set supply amounts are preset in stages within a range less than or equal to a steady supply amount corresponding to the steady operation output. The startup controller controls the raw fuel supply part to repeat a process of maintaining the amount of the raw fuel supplied from the raw fuel supply part at one set supply amount among the plurality of set supply amounts in sequence, starting from the smallest set supply amount, and after the output of the fuel cell has reached a set output corresponding to the one set supply amount, increasing the amount of the raw fuel to a set supply amount that is the next smallest after the one set supply amount. An initial supply amount that is the smallest set supply amount among the plurality of set supply amounts is greater than or equal to a first supply amount that is a supply amount of the raw fuel corresponding to auxiliary driving power necessary to drive auxiliary machinery that includes the raw fuel supply part, the oxidant gas supply part, and the heater. During the startup operation, electric power is supplied from an electric power system of an installation where the fuel cell system is installed to the auxiliary machinery. In a case where a power failure has occurred in the electric power system during the startup operation, electric power is supplied from the fuel cell to the auxiliary machinery under control of the startup controller. Accordingly, it is possible to suppress the stop of the fuel cell system when a power failure has occurred in the electric power system of an installation during the startup operation of the fuel cell system.

In a preferable embodiment of the present invention, the fuel cell system further includes a gas cylinder that retains the oxidant gas, and an uninterruptible power system. While a source of supply of electric power to the auxiliary machinery is switched from the electric power system to the fuel cell when a power failure has occurred during the startup operation, the oxidant gas supply part is stopped and the oxidant gas is supplied from the gas cylinder to the fuel cell, and electric power is supplied from the uninterruptible power system to the auxiliary machinery excluding the oxidant gas supply part.

In another preferable embodiment of the present invention, important facility driving power necessary to drive an important facility of the installation where the fuel cell system is installed is acquired in advance, and in a case where an output of the fuel cell when a power failure has occurred in the electric power system during the startup operation is greater than or equal to a total of the auxiliary driving power and the important facility driving power, electric power is supplied from the fuel cell to the auxiliary machinery and the important facility under control of the startup controller.

In another preferable embodiment of the present invention, important facility driving power necessary to drive an important facility of the installation where the fuel cell system is installed is acquired in advance. In a case where a second supply amount that is a supply amount of the raw fuel corresponding to a total of the auxiliary driving power and the important facility driving power is less than or equal to a supply amount corresponding to an upper limit amount of the unutilized fuel gas that can be burned by the exhaust gas combustor, the initial supply amount is set to be greater than or equal to the second supply amount and less than or equal to the supply amount corresponding to the upper limit amount, and in a case where the second supply amount is greater than the supply amount corresponding to the upper limit amount, the initial supply amount is set to be greater than or equal to the first supply amount and less than or equal to the supply amount corresponding to the upper limit amount.

In another preferable embodiment of the present invention, the fuel cell system further includes a temperature measuring part that measures a temperature of the exhaust gas combustor, and a cooling part that cools the exhaust gas combustor. While the raw fuel is supplied at the initial supply amount during the startup operation, the startup controller controls the cooling part in accordance with an output from the temperature measuring part to maintain the temperature of the exhaust gas combustor at a predetermined upper limit temperature or less.

More preferably, the cooling part includes cooling piping that guides the oxidant gas sent out from the oxidant gas supply part to the exhaust gas combustor, and a flow controller that is provided in the cooling piping and controls a flow rate of the oxidant gas.

These and other objects, features, aspects and advantages of the present invention will become more apparent from the following detailed description of the present invention when taken in conjunction with the accompanying drawings.

DESCRIPTION OF EMBODIMENTS

Figure 1:
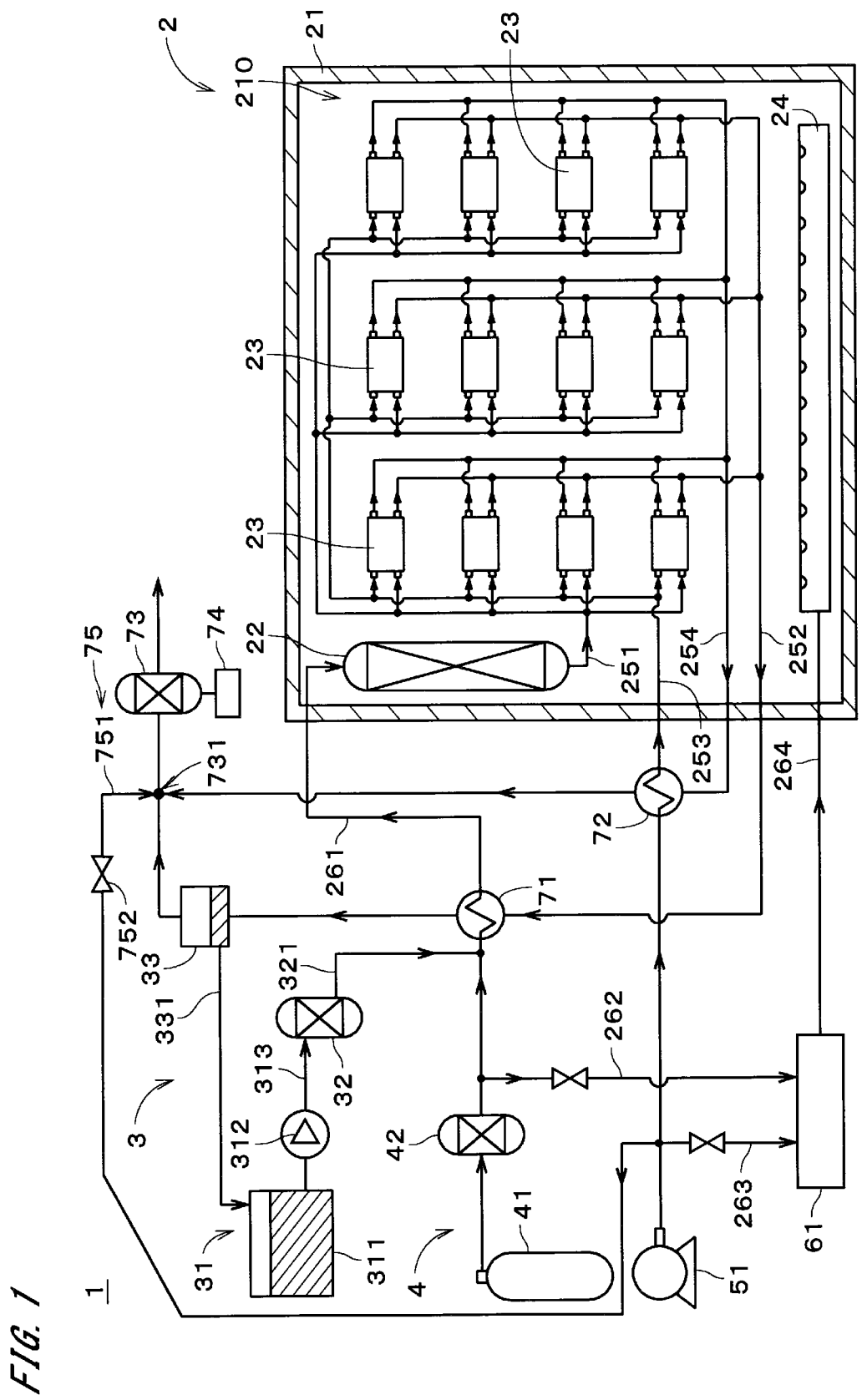
FIG. 1 illustrates a configuration of a fuel cell system according to a first embodiment.

FIG. 1 illustrates a configuration of a fuel cell system 1 according to a first embodiment of the present invention.

The fuel cell system 1 is a power generation system that generates electric power by using fuel cells. The fuel cell system 1 includes a hot module 2, a raw fuel supply part 4, a blower 51, a heater 61, a first heat exchanger 71, a second heat exchanger 72, an exhaust gas combustor 73, a temperature measuring part 74, and a cooling part 75.

The hot module 2 includes a housing 21, a reformer 22, a plurality of fuel cells 23, and a heat supply part 24. The housing 21 is, for example, a casing in the shape of a generally rectangular parallelepiped. FIG. 1 illustrates part of the configuration (e.g., housing 21) of the fuel cell system 1 in cross-section. The inner face of the housing 21 is made of a thermal insulating material (e.g., rock wool) having relatively high heat insulating properties. As an example of the housing 21, a metallic container with the entire inner face covered with a thermal insulating material is used.

The reformer 22, the plurality of fuel cells 23, and the heat supply part 24 are housed in an internal space 210 of the housing 21. The heat supply part 24 is primarily used during a startup operation of the fuel cell system 1, which will be described later. In the example illustrated in FIG. 1, twelve fuel cells 23 are housed in the internal space 210 of the housing 21. The fuel cells 23 are each a solid oxide fuel cell (SOFC). Each fuel cell 23 is, for example, a cell stack in which a plurality of cells (electric cells), not shown, are stacked in the up-down direction. The outside shape of the fuel cells 23 is, for example, a generally rectangular parallelepiped. The number of fuel cells 23 housed in the housing 21 may be changed variously.

Each fuel cell 23 receives a supply of fuel gas at its negative electrode (anode) and receives a supply of oxidant gas at its positive electrode (cathode). Thus, each fuel cell 23 produces an electrochemical reaction and generates electric power. In other words, each fuel cell 23 generates electric power by using the fuel gas and the oxidant gas. The electrochemical reaction produced by the fuel cell 23 is an exothermic reaction, and the generated heat is used in, for example, operations such as heating the reformer 22 that performs reforming, which is an endothermic reaction. The fuel cells 23 generate electric power at higher temperatures in the range of, for example, 600 degrees Celsius to 1000 degrees Celsius. The fuel gas is, for example, hydrogen gas. The oxidant gas is, for example, oxygen. The fuel gas may be any various gas other than hydrogen gas, and the oxidant gas may be any various gas other than oxygen.

The negative electrode of each fuel cell 23 is connected to the reformer 22 through a fuel gas supply pipe 251 that branches off inside the housing 21. The reformer 22 is connected through a raw fuel supply pipe 261 to the raw fuel supply part 4 disposed outside the housing 21. The raw fuel supply part 4 supplies raw fuel and water vapor to the reformer 22. The raw fuel supply part 4 includes a raw fuel supply source 41, an impurity remover 42, and a water vapor supply part 3. The impurity remover 42 is disposed in the raw fuel supply pipe 261 and removes impurities (e.g., sulfur-based impurities and nitrogen-based impurities) from the raw fuel supplied from the raw fuel supply source 41 to the reformer 22.

The water vapor supply part 3 includes a water supply part 31, a water vapor generator 32, and a condenser 33. The water supply part 31 supplies water to the water vapor generator 32. Specifically, the water supply part 31 includes a water reservoir 311, a pump 312, and a water supply pipe 313. The water reservoir 311 is a tank for retaining water (e.g., deionized water). The water reservoir 311 is connected through the water supply pipe 313 to the water vapor generator 32. The pump 312 is provided in the water supply pipe 313 and supplies the water retained in the water reservoir 311 to the water vapor generator 32.

The condenser 33 condenses water vapor in an exhaust gas to generate water and supplies the water via the water supply part 31 to the water vapor generator 32 during a steady operation of the fuel cell system 1. The aforementioned steady operation refers to an operational state in which the fuel cell system 1 steadily generates electric power at a predetermined output. The predetermined output refers to a rated output of the fuel cell system 1 or a fixed output less than the rated output, and is hereinafter referred to as a "steady operation output." The startup operation refers to an operational state of the fuel cell system 1 from startup to the start of the steady operation (i.e., until the output from the fuel cells 23 reaches the steady operation output and is stabilized). The water vapor generator 32 heats the water supplied from the water supply part 31 to generate water vapor. The water vapor generator 32 is connected through a water vapor supply pipe 321 to the raw fuel supply pipe 261. The water vapor supply pipe 321 is connected to the raw fuel supply pipe 261 upstream of the first heat exchanger 71 (specifically, between the first heat exchanger 71 and the impurity remover 42). The water vapor from the water vapor generator 32 passes through the first heat exchanger 71 and is supplied to the reformer 22, along with the raw fuel that has passed through the impurity remover 42.

The reformer 22 reforms the raw fuel to generate reformed gas that contains the fuel gas. The raw fuel is, for example, a hydrocarbon fuel. The raw fuel may be any of various types of fuels other than a hydrocarbon fuel. As an example of the raw fuel, fuels such as LP gas, town gas, natural gas, kerosene, biogas, or bioethanol is used. The reformer 22 reforms the raw fuel by, for example, a water vapor reforming process, a partial oxidation reforming process, an autothermal reforming process, or a combination of these reforming processes. In the example illustrated in FIG. 1, the reformer 22 reforms town gas, which is the raw fuel supplied from the raw fuel supply source 41, at a high temperature by the water vapor reforming process using the water vapor supplied from the water vapor generator 32, and generates reformed gas that contains hydrogen gas serving as the fuel gas. The reformed gas from the reformer 22 is supplied through the fuel gas supply pipe 251 to the negative electrodes of the plurality of fuel cells 23.

Negative electrode exhaust gas that is the gas discharged from the negative electrodes of the fuel cells 23 is collected in a negative electrode exhaust gas exhaust pipe 252 and discharged through the negative electrode exhaust gas exhaust pipe 252 to the outside of the housing 21. The negative electrode exhaust gas contains, for example, water vapor and unutilized fuel gas, the water vapor being generated as a result of the fuel cells 23 using the hydrogen gas as the fuel gas for electric power generation, and the unutilized fuel gas being gas that has not been used by the fuel cells 23 for electric power generation. In the following description, the fuel gas discharged in an unutilized state from the fuel cells 23 is referred to as "unutilized fuel gas."

The negative electrode exhaust gas from the plurality of fuel cells 23 is guided through the negative electrode exhaust gas exhaust pipe 252 to the first heat exchanger 71 outside the housing 21. The first heat exchanger 71 is disposed in the raw fuel supply pipe 261. The first heat exchanger 71 uses the high-temperature negative electrode exhaust gas flowing through the negative electrode exhaust gas exhaust pipe 252 to preheat the raw fuel and the water vapor, which are supplied respectively from the raw fuel supply source 41 and the water vapor generator 32 to the reformer 22.

On the other hand, the negative electrode exhaust gas that has passed through the first heat exchanger 71 is guided through the negative electrode exhaust gas exhaust pipe 252 to the aforementioned condenser 33. The condenser 33 condenses water vapor in the negative electrode exhaust gas to generate water. The water generated by the condenser 33 is sent through a water supply pipe 331 to the water reservoir 311 of the water supply part 31, and the water in the water reservoir 311 is supplied to the water vapor generator 32 by the pump 312. The negative electrode exhaust gas that has passed through the condenser 33 is guided to the exhaust gas combustor 73.

The positive electrode of each fuel cell 23 is connected through an oxidant gas supply pipe 253 that branches off inside the housing 21 to the blower 51 disposed outside the housing 21. The blower 51 supplies air that contains oxygen serving as the oxidant gas through the oxidant gas supply pipe 253 to the positive electrodes of the plurality of fuel cells 23. That is, the blower 51 serves as an oxidant gas supply part that supplies the oxidant gas to the fuel cells 23.

Positive electrode exhaust gas that is the gas discharged from the positive electrodes of the fuel cells 23 is collected in a positive electrode exhaust gas exhaust pipe 254 and discharged through the positive electrode exhaust gas exhaust pipe 254 to the outside of the housing 21. The positive electrode exhaust gas from the plurality of fuel cells 23 is guided through the positive electrode exhaust gas exhaust pipe 254 to the second heat exchanger 72 outside the housing 21. The second heat exchanger 72 uses the high-temperature positive electrode exhaust gas flowing through the positive electrode exhaust gas exhaust pipe 254 to preheat air that is supplied to each fuel cell 23.

The positive electrode exhaust gas exhaust pipe 254 after passing through the second heat exchanger 72 merges with the negative electrode exhaust gas exhaust pipe 252 at a confluence 731 located forward (i.e., upstream) of the exhaust gas combustor 73 outside the housing 21. At the confluence 731, the negative electrode exhaust gas that has passed through the first heat exchanger 71 and the condenser 33 merges with the positive electrode exhaust gas that has passed through the second heat exchanger 72. The exhaust gas combustor 73 burns the negative electrode exhaust gas and the positive electrode exhaust gas that have merged with each other. Accordingly, for example, the unutilized fuel gas contained in the negative electrode exhaust gas is burned. Combustion heat generated by the exhaust gas combustor 73 may be used in operations such as heating water in the water vapor generator 32, generating electric power by using a turbine or other equipment, or heating the reformer 22. As an example of the exhaust gas combustor 73, a catalytic combustor is used.

In the fuel cell system 1, the temperature measuring part 74 continuously measures the temperature of the exhaust gas combustor 73. If the temperature of the exhaust gas combustor 73 has increased excessively, the cooling part 75 cools the exhaust gas combustor 73. In the example illustrated in FIG. 1, the cooling part 75 includes cooling piping 751 and a flow controller 752. The cooling part 75 also includes the aforementioned blower 51. The cooling piping 751 guides the air sent out from the blower 51 serving as the oxidant gas supply part to the exhaust gas combustor 73. The flow controller 752 is provided in the cooling piping 751 and controls the flow rate of air flowing through the cooling piping 751. The exhaust gas combustor 73 is cooled by the cooling part 75 supplying approximately ordinary-temperature air to the exhaust gas combustor 73. Also, the temperature of the exhaust gas combustor 73 is controlled by the flow controller 752 controlling the flow rate of air that is supplied to the exhaust gas combustor 73. Accordingly, the temperature of the exhaust gas combustor 73 can be maintained at a predetermined upper limit temperature or less. The upper limit temperature of the exhaust gas combustor 73 is, for example, approximately 800 degrees Celsius.

During the steady operation of the fuel cell system 1, each of the fuel cells 23 generates electric power by using the fuel gas and the oxidant gas as described above. The heat generated when the fuel cells 23 generate electric power is applied to the reformer 22. The heat applied from the fuel cells 23 to the reformer 22 is used by, for example, the reformer 22 when reforming water vapor in the raw fuel.

Also, during the steady operation of the fuel cell system 1, the first heat exchanger 71 preheats the raw fuel and the water vapor that are supplied to the reformer 22, by using the negative electrode exhaust gas discharged from the fuel cells 23 as described above. Moreover, the second heat exchanger 72 preheats air that is supplied to each fuel cell 23, by using the positive electrode exhaust gas discharged from the fuel cells 23. Accordingly, the fuel cell system 1 can carry out a steady operation while generating, within the system, heat necessary for the system to carry out a steady operation. The fuel cell system 1 can carry out a steady operation while generating, within the system, water vapor necessary for the system to carry out a steady operation, because water vapor contained in the negative electrode exhaust gas is used in water vapor reforming performed by the reformer 22. In other words, the fuel cell system 1 is capable of carrying out a thermally autonomous operation and a water-autonomous operation during the steady operation.

Figure 2:
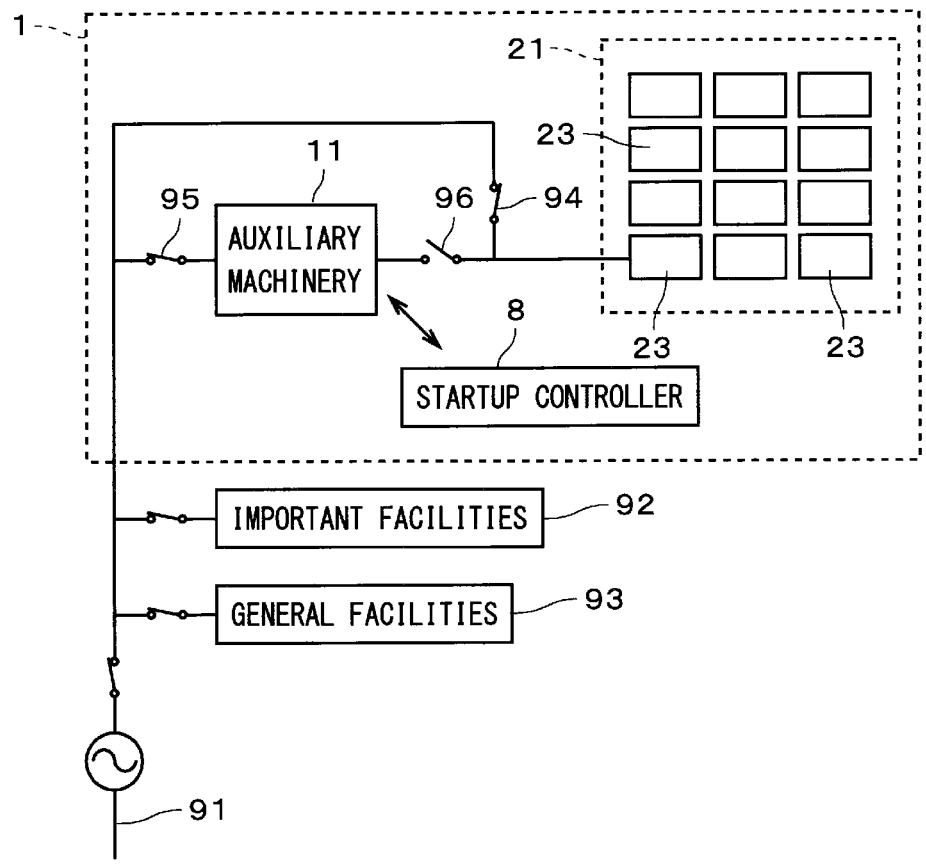
FIG. 2 schematically illustrates a connection state between the fuel cell system and an electric power system.

FIG. 2 schematically illustrates a connection state between the fuel cell system 1 and an electric power system 91 of an installation where the fuel cell system 1 is installed. Auxiliary machinery 11 of the fuel cell system 1 in FIG. 2 is a generic name for a plurality of actuators necessary to operate the fuel cell system 1. The auxiliary machinery 11 includes the raw fuel supply part 4, the blower 51 serving as the oxidant gas supply part, and the heater 61, which are illustrated in FIG. 1. The auxiliary machinery 11 may also include constituent elements other than the raw fuel supply part 4, the blower 51, and the heater 61.

In FIG. 2, the housing 21 that houses the plurality of fuel cells 23 is indicated by a broken line, and the configuration of the fuel cell system 1 is enclosed by another broken line. The fuel cell system 1 includes a startup controller 8 that controls the auxiliary machinery 11 and other constituent elements. Among the constituent elements of the fuel cell system 1, those other than the housing 21, the fuel cells 23, the auxiliary machinery 11, and the startup controller 8 are not shown in FIG. 2. Although the auxiliary machinery 11 illustrated in FIG. 2 is connected to one fuel cell 23, in actuality the auxiliary machinery 11 is connected to the plurality of fuel cells 23. The same applies to FIG. 6, which will be described later.

Important facilities 92 and general facilities 93 in FIG. 2 are facilities of the aforementioned installation where the fuel cell system 1 is installed. The important facilities 92 are a group of facilities that have a relatively high degree of importance in the installation. The general facilities 93 are a group of facilities of the installation that are not included in the important facilities 92 and have a lower degree of importance than the important facilities 92. The important facilities 92 differ depending on the installation where the fuel cell system 1 is installed. For example, the important facilities 92 of supermarkets and convenience stores include refrigeration facilities or the like. The important facilities 92 of plants for manufacturing equipment or the like include facilities relating to manufacturing lines. The important facilities 92 of such manufacturing plants may also include air conditioning facilities. The important facilities 92 of hospitals or other such establishments include illumination facilities and air conditioning facilities. Also, the important facilities 92 of various installations include communication facilities such as telephone systems.

The auxiliary machinery 11, the important facilities 92, and the general facilities 93 are connected to the plurality of fuel cells 23 of the fuel cell system 1 and the electric power system 91 of the installation. During the steady operation of the fuel cell system 1, electric power output from the plurality of fuel cells 23 is supplied preferentially to, for example, the auxiliary machinery 11 and the important facilities 92. The electric power output from the fuel cells 23 is greater than the total of auxiliary driving power necessary to drive the auxiliary machinery 11 and important facility driving power necessary to drive the important facilities 92. Also, surplus electric power that excludes the auxiliary driving power and the important facility driving power from the electric power received from the fuel cells 23 is supplied to the general facilities 93. Note that the general facilities 93 may also receive a supply of electric power from the electric power system 91 of the installation.

In this way, in this installation, the fuel cell system 1 covers the auxiliary driving power necessary to drive the auxiliary machinery 11. Thus, even if a power failure has occurred in the electric power system 91 of the installation, it is possible to prevent or suppress the stop of the operation of the fuel cell system 1. The fuel cell system 1 also covers the important facility driving power necessary to drive the important facilities 92. Thus, even if a power failure has occurred in the electric power system 91, it is possible to prevent or suppress the stop of the important facilities 92 of the installation.

Figure 3:
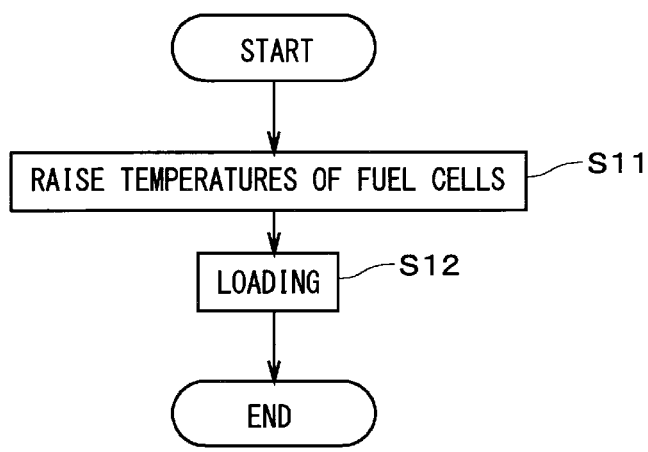
FIG. 3 illustrates a flow of a startup operation of the fuel cell system.

Next, the startup operation (so-called "cold start") of the fuel cell system 1 illustrated in FIG. 1 will be described with reference to FIG. 3. The startup operation of the fuel cell system 1 refers to an operation of changing the state of the fuel cell system 1 from a stopped state to a steady operational state in which electric power is steadily generated at the steady operation output as described above. The startup operation of the fuel cell system 1 uses the heater 61 and the water supply part 31 of the water vapor supply part 3. During the startup operation, the auxiliary machinery 11 (see FIG. 2) of the fuel cell system 1 receives a supply of electric power from the electric power system 91 of the installation where the fuel cell system 1 is installed. The important facilities 92 and the general facilities 93 of the installation also receive a supply of electric power from the electric power system 91.

The heater 61 heats the interior of the housing 21 during the startup operation. Specifically, the heater 61 is connected through a startup raw fuel supply pipe 262 to the raw fuel supply source 41 via the impurity remover 42. The heater 61 is also connected through a startup gas supply pipe 263 to the blower 51. The heater 61 uses the raw fuel (e.g., LP gas, town gas, natural gas, kerosene, biogas, or bioethanol) received from the raw fuel supply source 41 and the gas (i.e., air) received from the blower 51 and containing the oxidant gas to generate heat-up gas that is high-temperature gas. For example, a gas burner is used as the heater 61, and the heat-up gas is generated by the heater 61 burning the raw fuel.

The high-temperature heat-up gas generated by the heater 61 is supplied through a heat-up gas supply pipe 264 to the heat supply part 24 inside the housing 21 and supplied from the heat supply part 24 to the internal space 210 of the housing 21. In the fuel cell system 1, the reformer 22 and the plurality of fuel cells 23 inside the housing 21 are heated and increase in temperature as a result of a continuous supply of the heat-up gas from the heat supply part 24 to the internal space 210 (step S11). When the temperatures of the fuel cells 23 have risen to a predetermined temperature (e.g., a temperature in the range of approximately 600 degrees Celsius to 1000 degrees Celsius), the temperature rise process in step S11 ends. This temperature rise process takes approximately 8 to 15 hours, for example. During the startup operation of the fuel cell system 1, even after the end of the temperature rise process, the heat-up gas is continuously supplied from the heater 61 to the inside of the housing 21 in order to maintain the temperature in the housing 21.

Next, in the water vapor supply part 3, the water in the water reservoir 311 is supplied to the water vapor generator 32 by the pump 312 as described above. The water vapor generator 32 heats the water supplied from the water supply part 31 to generate water vapor. Also, the supply of the raw fuel from the raw fuel supply source 41 is started. The raw fuel from the raw fuel supply source 41 and the water vapor from the water vapor generator 32 are supplied through the first heat exchanger 71 to the reformer 22. Then, the reformer 22 reforms the raw fuel by the water vapor reforming process, so that the reformed gas containing the fuel gas is generated and supplied to the negative electrodes of the plurality of fuel cells 23. On the other hand, the air containing the oxidant gas is supplied from the blower 51 to the positive electrodes of the plurality of fuel cells 23. Accordingly, the fuel cells 23 start to generate electric power.

Then, after a predetermined period of time has elapsed since the start of supply of the raw fuel, current drawing (i.e., loading) from the plurality of fuel cells 23 is started (step S12). The reformer 22 is further heated by the heat generated by the plurality of fuel cells 23 when generating electric power. The negative electrode exhaust gas from the plurality of fuel cells 23 is guided to the condenser 33 as described above. The water generated from the negative electrode exhaust gas by the condenser 33 is supplied to the water vapor generator 32 via the water supply part 31. The negative electrode exhaust gas that has passed through the condenser 33 is guided along with the positive electrode exhaust gas to the exhaust gas combustor 73, and the unutilized fuel gas contained in the negative electrode exhaust gas is burned by the exhaust gas combustor 73.

During the startup operation of the fuel cell system 1, the amount of raw fuel supplied from the raw fuel supply part 4 to the reformer 22 per unit time increases in stages and the amount of fuel gas supplied to the plurality of fuel cells 23 per unit time increases in stages under the control of the startup controller 8 (see FIG. 2). The output from the fuel cells 23 (i.e., current drawn from the fuel cells 23 during loading) also increases in stages. This prevents a rapid change in the states of the fuel cells 23. This also prevents the temperature of the exhaust gas combustor 73 from increasing excessively as a result of the exhaust gas combustor 73 burning a large amount of unutilized fuel gas.

In the fuel cell system 1, the aforementioned gradual loading continues until the output from the plurality of fuel cells 23 reaches the aforementioned steady operation output and is stabilized, i.e., until the fuel cell system 1 transitions to the steady operational state. When the steady operation of the fuel cell system 1 has started and the aforementioned thermally autonomous operation has been established, the generation of the heat-up gas by the heater 61 and the supply of the heat-up gas from the heat supply part 24 to the internal space 210 are stopped.

Figure 4:
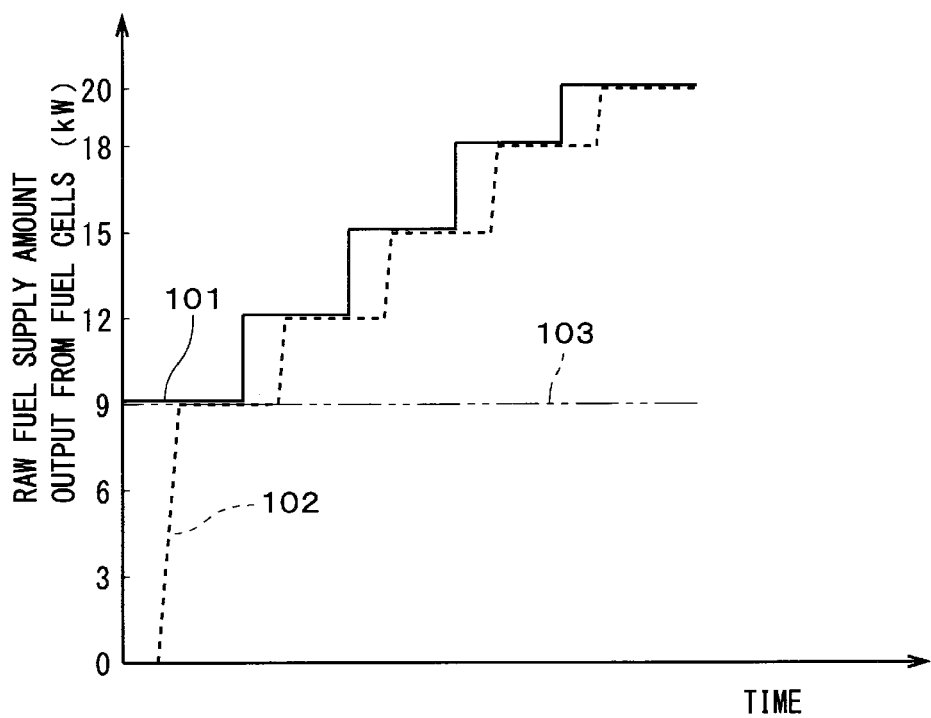
FIG. 4 illustrates a change in the amount of supply of raw fuel and a change in output from fuel cells during the startup operation of the fuel cell system.

FIG. 4 illustrates a change in the amount of supply of raw fuel and a change in output from the plurality of fuel cells 23 during the startup operation of the fuel cell system 1. The horizontal axis in FIG. 4 indicates the time elapsed since the start of loading. The vertical axis in FIG. 4 indicates the amount of raw fuel supplied per unit time from the raw fuel supply part 4 (hereinafter, also simply referred to as "supply amount") and a total output from the plurality of fuel cells 23. The numeric values on the vertical axis indicate the total output (hereinafter, also simply referred to as "output") from the plurality of fuel cells 23. A solid line 101 and a broken line 102 in FIG. 4 respectively indicate a change in raw fuel supply amount and a change in output from the plurality of fuel cells 23.

As illustrated in FIG. 4, during the startup operation of the fuel cell system 1, the startup controller 8 controls the raw fuel supply part 4 such that the amount of raw fuel supplied from the raw fuel supply part 4 increases in stages. Specifically, for the amount of raw fuel supplied from the raw fuel supply part 4, a plurality of set supply amounts are preset in stages in the startup controller 8 within a range less than or equal to a steady supply amount corresponding to the steady operation output (i.e., the amount of fuel cell supplied during the steady operation of the fuel cell system 1).

By the startup controller 8 controlling the raw fuel supply part 4, the amount of raw fuel supplied from the raw fuel supply part 4 is maintained at an initial supply amount that is the smallest set supply amount among the plurality of set supply amounts. Then, after a predetermined period of time has elapsed since the start of supply of the raw fuel, loading from the plurality of fuel cells 23 is started. Accordingly, the output from the plurality of fuel cells 23 increases, and after the output has reached an output corresponding to the initial supply amount, the amount of raw fuel supplied from the raw fuel supply part 4 is increased to a set supply amount that is the next smallest after the initial supply amount. The rate of increase of the output from the plurality of fuel cells 23 is, for example, one ampere (A) per second. The time required from when the output from the plurality of fuel cells 23 starts to increase to when this output reaches an output corresponding to the initial supply amount is, for example, within one minute.

The initial supply amount is greater than or equal to a first supply amount that is a raw fuel supply amount corresponding to the aforementioned auxiliary driving power (i.e., the amount of raw fuel supplied when the output from the plurality of fuel cells 23 is equal to the auxiliary driving power). The auxiliary driving power is, for example, 9 kW. In FIG. 4, the auxiliary driving power is indicated by a dashed double-dotted line 103. In the example illustrated in FIG. 4, the output corresponding to the initial supply amount from the plurality of fuel cells 23 is 9 kW, and the steady operation output is 20 kW. Also, outputs corresponding to the plurality of set supply amounts other than the initial supply amount are 12 kW, 15 kW, and 18 kW. In the example illustrated in FIG. 4, the outputs corresponding to the plurality of set supply amounts other than the initial supply amount are set at approximately equal intervals. The initial supply amount is greater than a difference between each pair of adjacent set supply amounts among the aforementioned plurality of set supply amounts.

The fuel cell system 1 repeats the process of maintaining the amount of raw fuel supplied from the raw fuel supply part 4 at one set supply amount among the plurality of set supply amounts in sequence, starting from the smallest set supply amount, and after the output from the plurality of fuel cells 23 has reached an output (hereinafter, referred to as "set output") corresponding to the one set supply amount, increasing the amount of raw fuel to a set supply amount that is the next smallest after the one set supply amount. Then, the startup operation of the fuel cell system 1 ends when the amount of raw fuel supplied from the raw fuel supply part 4 has reached the steady supply amount and the output from the plurality of fuel cells 23 has reached the steady operation output and is stabilized.

In the example illustrated in FIG. 4, the raw fuel supply amount is maintained at the one set supply amount for a predetermined period of time after the output from the fuel cells 23 has reached each set output. Accordingly, the temperatures of the fuel cells 23 and the output from the fuel cells 23, for example, are further stabilized at values corresponding to the one set supply amount. The time for which the raw fuel supply amount is maintained at each set supply amount is, for example, approximately 10 minutes.

Figure 5:
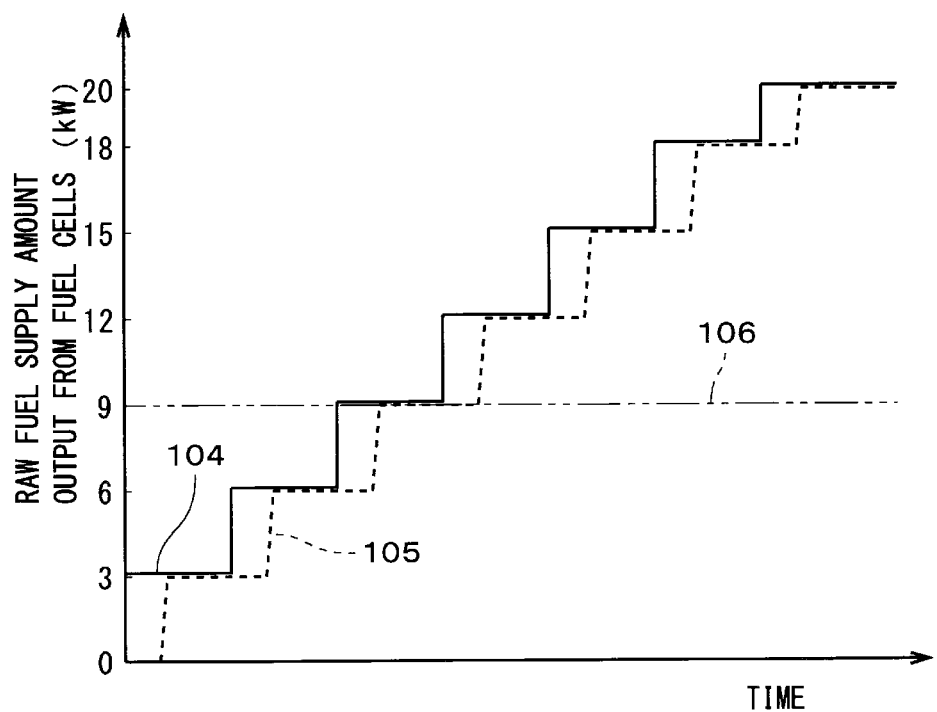
FIG. 5 illustrates a change in the amount of supply of raw fuel and a change in output from fuel cells during the startup operation of a fuel cell system according to a comparative example.

FIG. 5 illustrates a change in raw fuel supply amount and a change in output from the fuel cells during the startup operation of a fuel cell system according to a comparative example. The horizontal axis and the vertical axis in FIG. 5 are the same as the horizontal axis and the vertical axis in FIG. 4. A solid line 104, a broken line 105, and a dashed double-dotted line 106 in FIG. 5 respectively indicate a change in raw fuel supply amount, a change in output from the plurality of fuel cells, and the auxiliary driving power in the fuel cell system according to the comparative example.

In the fuel cell system according to the comparative example, the raw fuel supply amount also increases in stages so as to become equal in sequence to a plurality of set supply amounts. In the fuel cell system according to the comparative example, outputs of the fuel cells corresponding to the plurality of set supply amounts are set at approximately equal intervals. The steady operation output is 20 kW, and the outputs corresponding to the plurality of set supply amounts are 3 kW, 6 kW, 9 kW, 12 kW, 15 kW, and 18 kW.

Incidentally, if a power failure has occurred in the electric power system of an installation where the fuel cell system is installed and accordingly the auxiliary machinery stops during the startup operation of the fuel cell system, the startup operation needs to be done over again from the temperature rise of the fuel cells as described above. In view of this, when a power failure has occurred in the electric power system of the installation, it is conceivable to drive the auxiliary machinery by electric power that is output from the fuel cell system. However, in the fuel cell system according to the comparative example, the set output (3 kW) corresponding to the initial supply amount of the raw fuel is smaller than the auxiliary driving power (9 kW), and if a power failure has occurred in the electric power system while the raw fuel is supplied at the initial supply amount, it is not possible to drive the auxiliary machinery and to continue the startup operation. Thus, there is a need to wait for the recovery of the electric power system in the installation and to do the startup operation of the fuel cell system over again from the temperature rise of the fuel cells. As a result, the time required for the startup operation increases, and the amount of raw fuel that is used to raise the temperatures of the fuel cells also increases.

On the other hand, in the fuel cell system 1 according to the present embodiment, the initial supply amount of the raw fuel from the raw fuel supply part 4 is greater than or equal to the first supply amount that is the raw fuel supply amount corresponding to the auxiliary driving power, and the output from the plurality of fuel cells 23 can reach an output greater than or equal to the auxiliary driving power in a short time. Accordingly, even if the raw fuel is being supplied at the initial supply amount when a power failure has occurred in the electric power system 91 during the startup operation of the fuel cell system 1, it is possible to supply electric power from the plurality of fuel cells 23 to the auxiliary machinery 11 and continue to drive the auxiliary machinery 11 under the control of the startup controller 8. Specifically, switches 94 and 95 in FIG. 2 are switched from on to off, and a switch 96 is switched from off to on.

In this way, the fuel cell system 1 can immediately switch to its autonomous operation when a power failure has occurred during the startup operation. This suppresses the stop of the fuel cell system 1 under the startup operation. As a result, after the recovery of the electric power system 91, the auxiliary machinery 11 can be reconnected to the electric power system 91, and the startup operation can resume immediately.

The fuel cells 23 do not generate electric power at the start of the supply of raw fuel during the startup operation of the fuel cell system 1, and therefore a relatively large amount of unutilized fuel gas is sent out from the fuel cells 23 to the exhaust gas combustor 73. Thus, while the raw fuel is supplied at the initial supply amount during the startup operation in the fuel cell system 1, the startup controller 8 controls the cooling part 75 in accordance with the output from the temperature measuring part 74 (i.e., the temperature of the exhaust gas combustor 73) so that the exhaust gas combustor 73 is cooled as necessary. Accordingly, the temperature of the exhaust gas combustor 73 is maintained at a predetermined upper-limit temperature or less. As a result, it is possible to avoid a situation where the exhaust gas combustor 73 stops due to an excessive increase in temperature during the startup operation of the fuel cell system 1.

The cooling part 75 includes the cooling piping 751 and the flow controller 752 as described above. The cooling piping 751 guides the oxidant gas sent out from the blower 51 to the exhaust gas combustor 73. The flow controller 752 is provided in the cooling piping 751 and controls the flow rate of the oxidant gas. In this way, the blower 51 serving as the oxidant gas supply part, which supplies the oxidant gas to the fuel cells 23, is used to cool the exhaust gas combustor 73. This simplifies the structure of the fuel cell system 1.

When the raw fuel supply amount is at the initial supply amount, the flow rate of oxidant gas supplied from the blower 51 to the fuel cells 23 is smaller than that supplied during the steady operation of the fuel cell system 1 (i.e., when the raw fuel supply amount is at the steady supply amount). Thus, it is possible to use the blower 51 to cool the exhaust gas combustor 73 without increasing the capacity (i.e., rated flow rate) of the blower 51.

Figure 6:
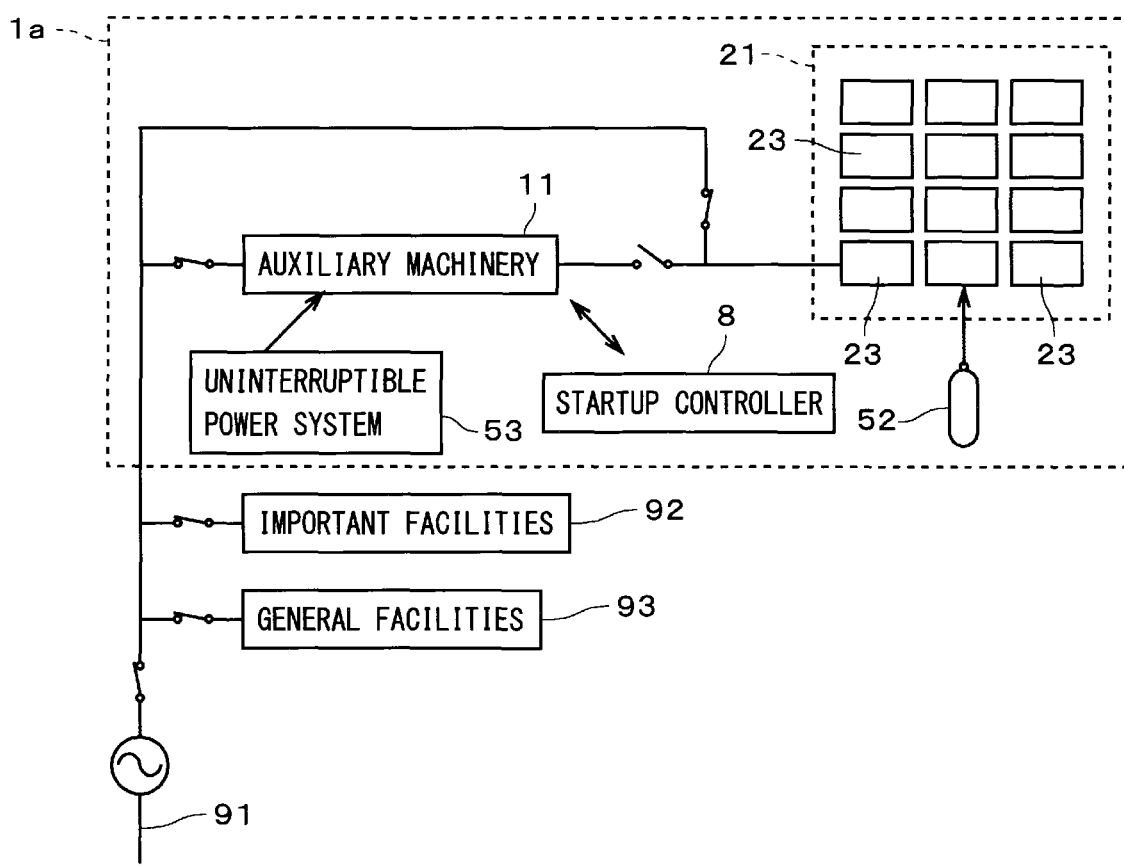
FIG. 6 schematically illustrates a connection state between a fuel cell system according to a second embodiment and the electric power system.

FIG. 6 illustrates a fuel cell system 1a according to a second embodiment of the present invention. Similarly to FIG. 2, FIG. 6 schematically illustrates a connection state between the fuel cell system 1a and an electric power system 91 of an installation where the fuel cell system 1a is installed. In addition to the constituent elements of the aforementioned fuel cell system 1, the fuel cell system 1a further includes a gas cylinder 52 and an uninterruptible power system 53. The gas cylinder 52 retains air containing oxygen that serves as oxidant gas. The gas cylinder 52 may retain only the oxidant gas. Although the gas cylinder 52 illustrated in FIG. 6 is connected to one fuel cell 23, in actuality the gas cylinder 52 is connected to a plurality of fuel cells 23. The other constituent elements of the fuel cell system 1*a* are approximately the same as those of the fuel cell system 1 illustrated in FIG. 1, and corresponding constituent elements are given the same reference numerals in the following description. Also, the connection of the fuel cell system 1*a* with the electric power system 91 and other systems is the same as the connection of the fuel cell system 1 with the electric power system 91 and other systems in FIG. 2.

The startup operation of the fuel cell system 1*a* is approximately the same as the startup operation of the aforementioned fuel cell system 1. When a power failure has occurred in the electric power system 91 during the startup operation of the fuel cell system 1*a*, it is possible, as described above, to supply electric power from the plurality of fuel cells 23 to the auxiliary machinery 11 and continue to drive the auxiliary machinery 11 under the control of the startup controller 8.

In the fuel cell system 1*a*, while the source of supply of electric power to the auxiliary machinery 11 is switched from the electric power system 91 to the plurality of fuel cells 23 due to a power failure occurring during the startup operation, the blower 51 (see FIG. 1) included in the auxiliary machinery 11 and serving as the oxidant gas supply part is stopped and the oxidant gas (or air containing oxidant gas) is supplied from the gas cylinder 52 to the plurality of fuel cells 23 under the control of the startup controller 8. Also, electric power is supplied from the uninterruptible power system 53 to the auxiliary machinery 11 other than the blower 51. The auxiliary machinery 11 other than the blower 51 refers to the constituent elements of the auxiliary machinery 11 excluding the blower 51 and includes, for example, the raw fuel supply part 4 and the heater 61 (see FIG. 1).

Accordingly, when a power failure has occurred during the startup operation, electric power can stably be supplied to the auxiliary machinery 11 even if the switching of the source of supply of electric power to the auxiliary machinery 11 takes some time (e.g., several seconds) and causes a time lag. In other words, the source of supply of electric power to the auxiliary machinery 11 can stably be switched from the electric power system 91 to the plurality of fuel cells 23 when a power failure has occurred during the startup operation. Also, the blower 51 that consumes a relatively large amount of electric power among the auxiliary machinery 11 is stopped and substituted for by the gas cylinder 52. This enables reducing the capacity (i.e., rated output) of the uninterruptible power system 53 that temporarily supplies electric power to the auxiliary machinery 11.

Note that, in the case where the temperature of the exhaust gas combustor 73 (see FIG. 1) has increased during the aforementioned switching of the source of supply of electric power to the auxiliary machinery 11, approximately ordinary temperature air may be supplied from the gas cylinder 52 through the cooling piping 751 to the exhaust gas combustor 73 as necessary in order to maintain the temperature of the exhaust gas combustor 73 at a predetermined upper limit temperature or less. In this case, the gas cylinder 52 is also included in the cooling part 75.

As described above, in the fuel cell system 1 or 1*a*, electric power is supplied from the plurality of fuel cells 23 to the auxiliary machinery 11 when a power failure has occurred in the electric power system 91 during the startup operation. Alternatively, the plurality of fuel cells 23 may also supply electric power to the important facilities 92 of the installation, in addition to supplying electric power to the auxiliary machinery 11. It is, however, noted that the important facility driving power necessary to drive the important facilities 92 differs depending on the installation and may differ even in the same installation according to conditions such as season, day of the week, and time period of the day. Thus, the important facility driving power of the installation where the fuel cell system 1 or 1*a* is installed is acquired in advance and stored in the startup controller 8 of the fuel cell system 1 or 1*a*. If the important facility driving power of the installation differs according to conditions such as season, day of the week, and time period of the day, the important facility driving power for each season, each day of the week, and each time period of the day is acquired and stored in the startup controller 8. Alternatively, a device such as a sensor that continuously measures the important facility driving power may be provided in the installation to continuously acquire the important facility driving power in advance for cases of occurrence of a power failure and store the measured values of the important facility driving power in the startup controller 8.

When a power failure has occurred in the electric power system 91 during the startup operation of the fuel cell system 1 or 1*a*, the output from the fuel cells 23 during loading and the total of the auxiliary driving power and the important facility driving power are compared with each other. Then, if the output from the plurality of fuel cells 23 is greater than or equal to the total of the auxiliary driving power and the important facility driving power, electric power is supplied from the fuel cells 23 to the auxiliary machinery 11 and the important facilities 92 under the control of the startup controller 8. Accordingly, even if a power failure has occurred in the electric power system 91, it is possible to suppress the stop of the fuel cell system 1 or 1*a* under the startup operation and the stop of the important facilities 92 of the installation. In other words, the fuel cell system 1 or 1*a* and the important facilities 92 can perform an autonomous operation.

If the output from the fuel cells 23 is greater than the total of the auxiliary driving power and the important facility driving power, the amount of raw fuel supplied from the raw fuel supply part 4 is reduced down to a value that is approximately equal to a raw fuel supply amount corresponding to the total of the auxiliary driving power and the important facility driving power during the power failure in the electric power system 91. In this case, the amount of raw fuel supplied from the raw fuel supply part 4 is preferably set to be approximately 105% of the raw fuel supply amount corresponding to the total of the auxiliary driving power and the important facility driving power in consideration of fluctuations in the important facility driving power during the power failure in the electric power system 91. If the important facility driving power greatly increases during the power failure in the electric power system 91, the supply of electric power from the plurality of fuel cells 23 to the important facilities 92 is stopped, although the supply of electric power from the plurality of fuel cells 23 to the auxiliary machinery 11 is maintained.

On the other hand, if the output from the fuel cells 23 is less than the total of the auxiliary driving power and the important facility driving power, the fuel cells 23 supply electric power to the auxiliary machinery 11 under the control of the startup controller 8, without supplying electric power to the important facilities 92. Accordingly, it is possible to suppress the stop of the fuel cell system 1 or 1*a* under the startup operation even if a power failure has occurred in the electric power system 91. The fuel cell systems 1 and 1a can automatically determine whether or not to include the important facilities 92 of the installation within targets for the autonomous operation when a power failure has occurred in the electric power system 91.

In the above-described example, the initial supply amount of raw fuel during the startup operation of the fuel cell system 1 or 1a is equal to the first supply amount that is the raw fuel supply amount corresponding to the auxiliary driving power, but the initial supply amount may be variously changed as long as it is greater than or equal to the first supply amount. For example, the initial supply amount may be greater than or equal to a second supply amount that is a raw fuel supply amount corresponding to the total of the auxiliary driving power and the important facility driving power.

Meanwhile, there is a possibility that, when the supply of raw fuel is started during the startup operation of the fuel cell system 1 or 1a, almost the entire amount of fuel gas generated from the raw fuel supplied at the initial supply amount will be sent as unutilized fuel gas to the exhaust gas combustor 73 because the fuel cells 23 do not generate electric power, as described above. Thus, in order to maintain the temperature of the exhaust gas combustor 73 at a predetermined upper-limit temperature or less, it is preferable that the initial supply amount of raw fuel supplied from the raw fuel supply part 4 is less than or equal to a raw fuel supply amount corresponding to an upper limit amount of unutilized fuel gas that can be burned in the exhaust gas combustor 73. In other words, it is preferable that the amount of fuel gas generated from the raw fuel supplied at the initial supply amount is less than or equal to the upper limit amount of unutilized fuel gas that can be burned in the exhaust gas combustor 73.

In the fuel cell system 1 or 1a, as described above, the important facility driving power of the installation where the fuel cell system 1 or 1a is installed is acquired in advance and stored in the startup controller 8 of the fuel cell system 1 or 1a. Then, if the aforementioned second supply amount is less than or equal to the supply amount corresponding to the upper limit amount of unutilized fuel gas that can be burned in the exhaust gas combustor 73, the startup controller 8 determines the initial supply amount of the raw fuel supplied from the raw fuel supply part 4 to be within a range greater than or equal to the second supply amount and less than or equal to the supply amount corresponding to the above upper limit amount. If the second supply amount is greater than the supply amount corresponding to the above upper limit amount, the startup controller 8 determines the initial supply amount to be within a range greater than or equal to the first supply amount and less than or equal to the supply amount corresponding to the above upper limit amount. Accordingly, it is possible to avoid a situation where the exhaust gas combustor 73 stops due to an excessive increase in temperature during the startup operation of the fuel cell system 1 or 1a, while maximizing the number of constituent elements that are targeted for the autonomous operation when a power failure has occurred in the electric power system 91.

The aforementioned fuel cell systems 1 and 1a can be modified in various ways.

The fuel cell systems 1 and 1a do not necessarily have to include a plurality of fuel cells 23, and may include only one fuel cell 23 housed in the housing 21.

During the startup operation of the fuel cell systems 1 and 1a, the temperature of the exhaust gas combustor 73 may be maintained at a predetermined upper limit temperature or less by the startup controller 8 controlling the cooling part 75 in accordance with the output from the temperature measuring part 74 as described above while the raw fuel is supplied at a set supply amount other than the initial supply amount. This avoids a situation where the exhaust gas combustor 73 stops due to an excessive increase in temperature during the startup operation of the fuel cell systems 1 and 1a.

The cooling part 75 does not necessarily have to use the air sent out from the blower 51 for the cooling of the exhaust gas combustor 73. For example, the cooling part 75 may use water or water vapor to cool the exhaust gas combustor 73.

The heater 61 may be connected to another raw fuel supply source and another blower that are different from the raw fuel supply source 41 and the blower 51. In this case, raw fuel supplied from the other raw fuel supply source to the heater 61 may be a different type of raw fuel from that supplied from the raw fuel supply source 41 to the reformer 22. The heater 61 does not necessarily have to be a gas burner, and for example, a catalytic combustor or an electric heater may be used as the heater 61.

In the fuel cell systems 1 and 1a, water vapor in the negative electrode exhaust gas is taken out in the form of water by the condenser 33 and supplied via the water supply part 31 to the water vapor generator 32, but part of the negative electrode exhaust gas containing water vapor may be supplied as-is in a gaseous form to the reformer 22. Even in this case, a water-autonomous operation is possible during the steady operation.

The fuel cell systems 1 and 1a do not necessarily have to perform a thermally autonomous operation during the steady operation, and heat-up gas may be supplied continuously from the heater 61 to the internal space 210 of the housing 21. Also, the fuel cell systems 1 and 1a do not necessarily have to perform a water-autonomous operation during the steady operation and, for example, not only the water sent out from the condenser 33 to the water reservoir 311 but also the water supplied from the outside of the system to the water reservoir 311 may be supplied continuously to the water vapor generator 32.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST 1, 1a Fuel cell system
4 Raw fuel supply part
8 Startup controller
11 Auxiliary machinery
21 Housing
22 Reformer
23 Fuel cell
51 Blower
52 Gas cylinder
53 Uninterruptible power system
61 Heater
73 Exhaust gas combustor
74 Temperature measuring part
75 Cooling part
91 Electric power system
92 Important facilities 751 Cooling piping
752 Flow controller
S11, S12 Step

The invention claimed is:

1. A startup operation method of a fuel cell system, the fuel cell system comprising:
a reformer that reforms a raw fuel to generate a fuel gas;
a solid oxide fuel cell that generates electric power by using said fuel gas and an oxidant gas;
a housing that houses said reformer and said solid oxide fuel cell in an internal space thereof;
a raw fuel supply part that supplies said raw fuel to said reformer;
an oxidant gas supply part that supplies said oxidant gas to said solid oxide fuel cell;
an exhaust gas combustor that burns unutilized fuel gas discharged in an unutilized state from said solid oxide fuel cell; and
a heater that heats an interior of said housing during a startup operation, the method comprising:
a) presetting a plurality of set supply amounts of said raw fuel supplied from said raw fuel supply part to said reformer during the startup operation performed until an output of said fuel cell reaches a steady operation output, said plurality of set supply amounts being preset in stages within a range less than or equal to a steady supply amount corresponding to said steady operation output and
b) repeating a process of maintaining the amount of said raw fuel supplied from said raw fuel supply part to said reformer at one set supply amount among said plurality of set supply amounts in sequence, starting from the smallest set supply amount, and after the output of said solid oxide fuel cell has reached a set output corresponding to said one set supply amount, increasing the amount of said raw fuel to a set supply amount that is the next smallest after said one set supply amount, and
wherein, an initial supply amount that is the smallest set supply amount among said plurality of set supply amounts is greater than or equal to a first supply amount that is a supply amount of said raw fuel corresponding to auxiliary driving power necessary to drive auxiliary machinery that includes said raw fuel supply part, said oxidant gas supply part, and said heater;
during said startup operation, electric power is supplied from an electric power system of an installation where said solid oxide fuel cell system is installed to said auxiliary machinery, and
in a case where a power failure has occurred in said electric power system during said startup operation, electric power is supplied from said solid oxide fuel cell to said auxiliary machinery.

2. The startup operation method of the fuel cell system according to claim 1, wherein the fuel cell system further comprises:
a gas cylinder that retains said oxidant gas; and
an uninterruptible power system,
wherein, while a source of supply of electric power to said auxiliary machinery is switched from said electric power system to said solid oxide fuel cell when a power failure has occurred during said startup operation, said oxidant gas supply part is stopped and said oxidant gas is supplied from said gas cylinder to said solid oxide fuel cell, and electric power is supplied from said uninterruptible power system to said auxiliary machinery excluding said oxidant gas supply part.

3. The startup operation method of the fuel cell system according to claim 2, wherein
important facility driving power necessary to drive an important facility of said installation where said solid oxide fuel cell system is installed is acquired in advance, and
in a case where an output of said solid oxide fuel cell when a power failure has occurred in said electric power system during said startup operation is greater than or equal to a total of said auxiliary driving power and said important facility driving power, electric power is supplied from said solid oxide fuel cell to said auxiliary machinery and said important facility.

4. The startup operation method of the fuel cell system according to claim 3, wherein
important facility driving power necessary to drive an important facility of said installation where said solid oxide fuel cell system is installed is acquired in advance,
in a case where a second supply amount that is a supply amount of said raw fuel corresponding to a total of said auxiliary driving power and said important facility driving power is less than or equal to a supply amount corresponding to an upper limit amount of said unutilized fuel gas that can be burned by said exhaust gas combustor, said initial supply amount is set to be greater than or equal to said second supply amount and less than or equal to the supply amount corresponding to said upper limit amount, and
in a case where said second supply amount is greater than the supply amount corresponding to said upper limit amount, said initial supply amount is set to be greater than or equal to said first supply amount and less than or equal to the supply amount corresponding to said upper limit amount.

5. The startup operation method of the fuel cell system according to claim 4,
wherein the fuel cell system further comprises:
a temperature measuring part that measures a temperature of said exhaust gas combustor; and
a cooling part that cools said exhaust gas combustor,
wherein, while said raw fuel is supplied at said initial supply amount during said startup operation, said cooling part is controlled in accordance with an output from said temperature measuring part to maintain the temperature of said exhaust gas combustor at a predetermined upper limit temperature or less.

6. The startup operation method of the fuel cell system according to claim 5, wherein
said cooling part includes:
a cooling piping that guides said oxidant gas sent out from said oxidant gas supply part to said exhaust gas combustor; and
a flow controller that is provided in said cooling piping and controls a flow rate of said oxidant gas.

7. The startup operation method of the fuel cell system according to claim 1, wherein
important facility driving power necessary to drive an important facility of said installation where said solid oxide fuel cell system is installed is acquired in advance, and
in a case where an output of said solid oxide fuel cell when a power failure has occurred in said electric power system during said startup operation is greater than or equal to a total of said auxiliary driving power and said important facility driving power, electric power is supplied from said solid oxide fuel cell to said auxiliary machinery and said important facility.

8. The startup operation method of the fuel cell system according to claim 7, wherein important facility driving power necessary to drive an important facility of said installation where said solid oxide fuel cell system is installed is acquired in advance, in a case where a second supply amount that is a supply amount of said raw fuel corresponding to a total of said auxiliary driving power and said important facility driving power is less than or equal to a supply amount corresponding to an upper limit amount of said unutilized fuel gas that can be burned by said exhaust gas combustor, said initial supply amount is set to be greater than or equal to said second supply amount and less than or equal to the supply amount corresponding to said upper limit amount, and in a case where said second supply amount is greater than the supply amount corresponding to said upper limit amount, said initial supply amount is set to be greater than or equal to said first supply amount and less than or equal to the supply amount corresponding to said upper limit amount.

9. The startup operation method of the fuel cell system according to claim 8, wherein the fuel cell system further comprises:

a temperature measuring part that measures a temperature of said exhaust gas combustor; and a cooling part that cools said exhaust gas combustor, wherein, while said raw fuel is supplied at said initial supply amount during said startup operation, said cooling part is controlled in accordance with an output from said temperature measuring part to maintain the temperature of said exhaust gas combustor at a predetermined upper limit temperature or less.

10. The startup operation method of the fuel cell system according to claim 9, wherein said cooling part includes:

cooling piping that guides said oxidant gas sent out from said oxidant gas supply part to said exhaust gas combustor; and a flow controller that is provided in said cooling piping and controls a flow rate of said oxidant gas.

11. The startup operation method of the fuel cell system according to claim 1, wherein important facility driving power necessary to drive an important facility of said installation where said solid oxide fuel cell system is installed is acquired in advance, in a case where a second supply amount that is a supply amount of said raw fuel corresponding to a total of said auxiliary driving power and said important facility driving power is less than or equal to a supply amount corresponding to an upper limit amount of said unutilized fuel gas that can be burned by said exhaust gas combustor, said initial supply amount is set to be greater than or equal to said second supply amount and less than or equal to the supply amount corresponding to said upper limit amount, and in a case where said second supply amount is greater than the supply amount corresponding to said upper limit amount, said initial supply amount is set to be greater than or equal to said first supply amount and less than or equal to the supply amount corresponding to said upper limit amount.

12. The startup operation method of the fuel cell system according to claim 11, wherein the fuel cell system further comprises:

a temperature measuring part that measures a temperature of said exhaust gas combustor; and a cooling part that cools said exhaust gas combustor, wherein, while said raw fuel is supplied at said initial supply amount during said startup operation, said cooling part is controlled in accordance with an output from said temperature measuring part to maintain the temperature of said exhaust gas combustor at a predetermined upper limit temperature or less.

13. The startup operation method of the fuel cell system according to claim 12, wherein said cooling part includes:

cooling piping that guides said oxidant gas sent out from said oxidant gas supply part to said exhaust gas combustor; and a flow controller that is provided in said cooling piping and controls a flow rate of said oxidant gas.

14. The startup operation method of the fuel cell system according to claim 1, wherein the fuel cell system further comprises:

a temperature measuring part that measures a temperature of said exhaust gas combustor; and a cooling part that cools said exhaust gas combustor, wherein, while said raw fuel is supplied at said initial supply amount during said startup operation, said cooling part is controlled in accordance with an output from said temperature measuring part to maintain the temperature of said exhaust gas combustor at a predetermined upper limit temperature or less.

15. The startup operation method of the fuel cell system according to claim 14, wherein said cooling part includes:

cooling piping that guides said oxidant gas sent out from said oxidant gas supply part to said exhaust gas combustor; and a flow controller that is provided in said cooling piping and controls a flow rate of said oxidant gas.

\* \* \* \* \*